United States Patent [19]

Chapman

[11] Patent Number: 4,462,621

[45] Date of Patent: Jul. 31, 1984

[54] SWIVEL STOP

[75] Inventor: Earle F. Chapman, Barnard, Vt.

[73] Assignee: Chapman Mfg. Co. Inc., Avon, Mass. ; a part interest

[21] Appl. No.: 268,257

[22] Filed: May 29, 1981

[51] Int. Cl.³ .............................................. F16L 27/00

[52] U.S. Cl. .............................. 285/282; 285/DIG. 8; 403/113; 403/348

[58] Field of Search ........ 285/282, DIG. 8, DIG. 16; 403/348, 349, 117, 113

[56] References Cited

U.S. PATENT DOCUMENTS

| | | | |
|---|---|---|---|
| 2,242,303 | 5/1941 | Irmischer | 285/DIG. 8 X |
| 2,262,585 | 11/1941 | Irmischer | 285/282 X |
| 2,686,067 | 8/1954 | Stephans | 285/282 |
| 3,034,809 | 5/1962 | Greenberg | 285/282 X |
| 3,104,067 | 9/1963 | Stiffel | 285/DIG. 8 X |
| 3,784,235 | 1/1974 | Kessler | 285/DIG. 16 X |

FOREIGN PATENT DOCUMENTS

| | | | |
|---|---|---|---|
| 2003244 | 3/1979 | United Kingdom | 285/DIG. 16 |

*Primary Examiner*—Thomas F. Callaghan

*Attorney, Agent, or Firm*—Morse, Altman & Dacey

[57] ABSTRACT

A swivel stop for use in lamps of all kinds comprising a lower tube and an upper tube, a member partially secured within the lower tube and partially extending therefrom and formed with a keyway and a stop, and a sleeve secured within the upper tube and provided with a pair of keys.

The swivel stop preferably is designed in two versions: an extendable version and a non-extendable version.

12 Claims, 5 Drawing Figures

SWIVEL STOP

BACKGROUND OF THE INVENTION

1. Field of the Invention

The present invention relates generally to swivel stops and, more particularly, to a swivel stop joining a lower and an upper tube and including a member secured within one tube and cooperating with a sleeve secured in the other tube.

2. The Prior Art

Swivel stops find wide application in lamps of all kinds, be they table units, wall units, floor units or wall unit arm extensions. A swivel stop is intended to provide a lamp with angular adjustment without having to move the lamp physically. Some swivels are unrestricted in rotational movement, while others are constrained for rotational movement of one revolution. Some swivel joints are easy to assemble and to disassemble, so much so that they are prone to disengage accidentally. To prevent such accidental disengagements, certain swivel joints are overengineered and are thus costly. Still others require a separate collar member to join the ends of the tubes, as is the case in my copending application Ser. No. 261,675, filed May 7, 1981. In the swivel joint disclosed in this copending application Ser. No. 261,675, the swivel cannot be disassembled without first unscrewing this collar member from one of the tubes.

SUMMARY OF THE INVENTION

It is a principal object of the present invention to overcome the above shortcomings by providing a swivel joint of improved and simplified construction that will keep the unit together and yet prevent its accidental disengagement.

More specifically, it is an object of the present invention to provide a swivel stop for use in lamps of all kinds. The swivel stop essentially comprises a lower and an upper tube to be joined by a member partially secured within one of the tubes and partially extending therefrom and formed with a keyway and a stop. The partially extending portion of the member is designed cooperatively to engage a sleeve secured within the other tube and provided with a pair of angularly offset and axially spaced apart keys. Preferably, the swivel stop is designed in two versions, an extendable and a non-extendable version. Preferably, the partially extending portion of the member also is designed frictionally to engage the sleeve. Such frictional engagement permits the lengthwise adjustment in the extendable version, and it also helps to arrest the rotational adjustment of the swivel at the desired location.

Other and further objects of the present invention will in part be obvious and will in part appear hereinafter.

The invention accordingly comprises the swivel stop of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
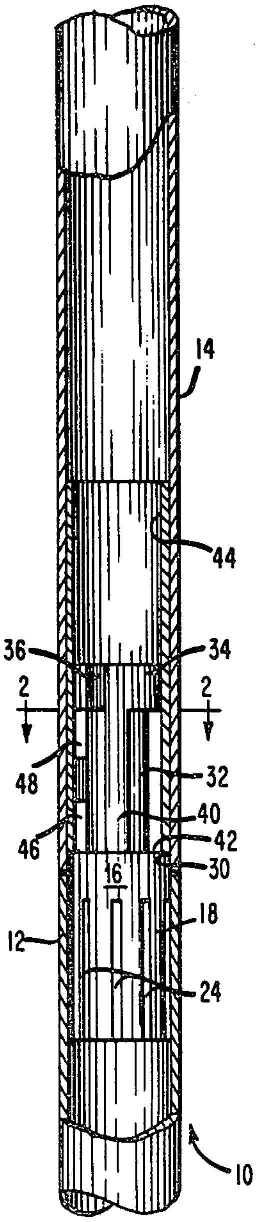
FIG. 1 is a vertical section, partly in elevation, of a swivel stop constructed in accordance with the present invention.
Figure 4:
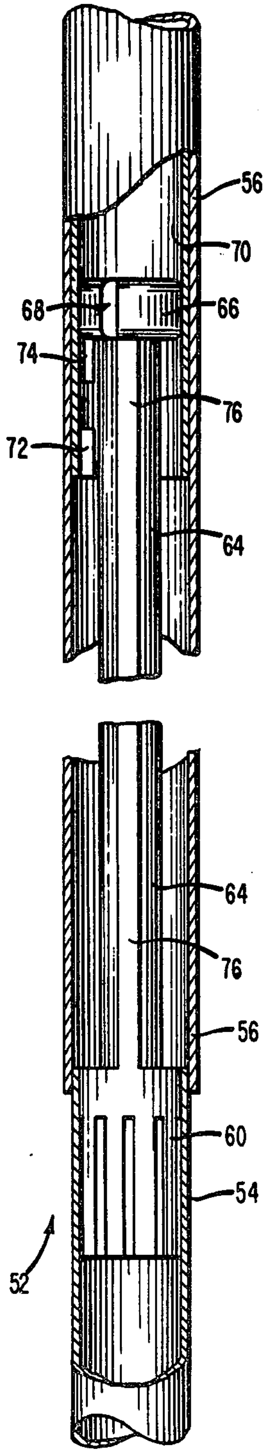
FIG. 4 is a view similar to that of FIG. 1 but showing an alternate embodiment of the swivel stop.
Figure 5:
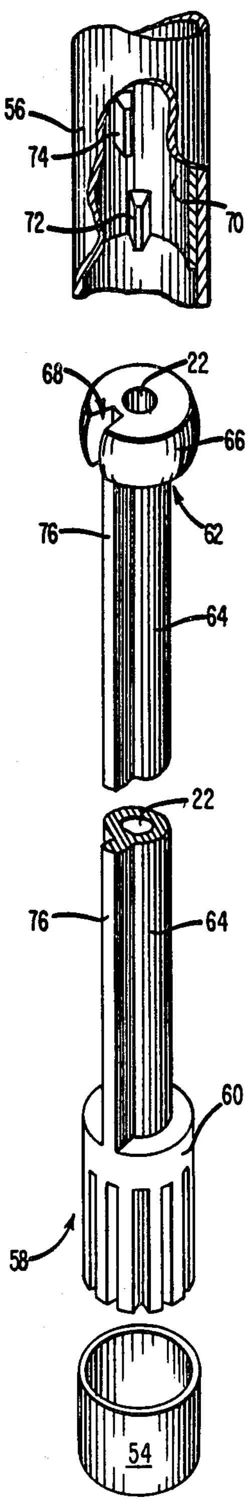
FIG. 5 is an exploded perspective view, partly in section, of the swivel stop shown in FIG. 4.

In general, one illustrated embodiment of a swivel stop 10 for the rotational joining of a lower tube 12 to an upper tube 14 is depicted in FIG. 1. This is the non-extendable version. The extendable version is shown in FIGS. 4 and 5.

It is to be understood that the tubes 12 and 14 preferably form part of a stanchion tube, the bottom end of which is secured to a base, if a floor lamp or table unit, or is secured to a wall or ceiling, if it is a wall unit or a wall unit with an extendable arm. The other end of the tubes 12 and 14 preferably is provided with a socket and a shade, and an electric cord preferably is accommodated internally through the tubes 12 and 14.

Figure 2:
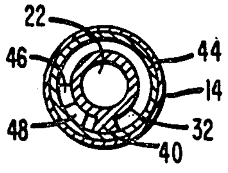
FIG. 2 is a horizontal section, along the line 2—2 of FIG. 1.
Figure 3:
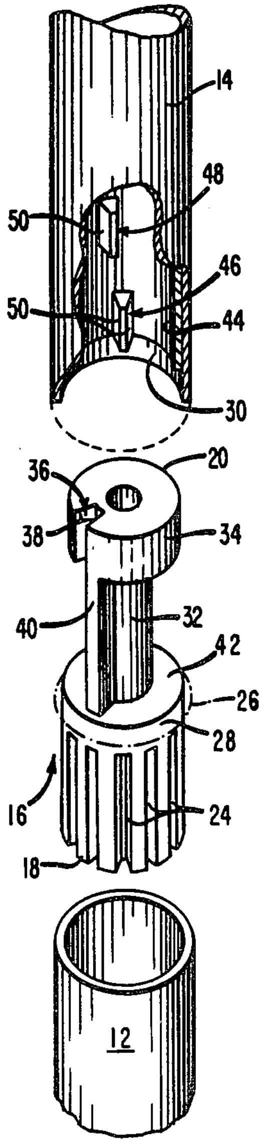
FIG. 3 is an exploded perspective view, partly in section, of the swivel stop shown in FIG. 1.

In the non-extendable version of the swivel stop 10 shown in FIGS. 1-3, the inner and outer diameters of the tubes 12 and 14 preferably are of the same size so that they abut one another when joined, observe FIG. 1. A member 16, formed of a lower, cylindrical portion 18 and an upper portion 20, is designed to be partially secured within the lower tube 12 and to be partially extending therefrom. The member 16 preferably also is provided with a concentric axial hole 22, through which an electric cord (not shown) may pass. The external diameter of the cylindrical portion 18 of the member 16 is slightly less than the internal diameter of the lower tube 12 so that it can fit snugly therein. Preferably, the cylindrical portion 18 also is provided with a plurality of external, radial grooves 24 that extend almost, but not quite, the axial length of the cylindrical portion 18. These grooves 24 are provided to facilitate the member 16 being securely held within the lower tube 12. Preferably, such securing is effected by filling the grooves 24 with a suitable adhesive, compatible with the material forming the member 16 and the tube 12. It is pointed out that the swivel stop 10 and its component parts may be formed of any suitable material or a combination of materials, such as metal, plastic, glass or the like. Preferably, the cylindrical portion 18 of member 16 is inserted within the lower tube 12 up to a dashed line 26, FIG. 3, located about midway of a smooth segment 28 above the grooves 24. The smooth segment 28 facilitates the angular displacement thereabout of a free end 30 of the upper tube 14, note FIG. 1.

The upper portion 20 of the member 16 essentially is formed of a neck 32 and a head 34. The head 34 is provided with a keyway 36, axially extending through the head 34. Preferably, the keyway 36 is formed with radial, converging sidewalls 38, substantially as if a piece had been cut from a cake or a pie. Preferably, one sidewall 38 also forms one side of a stop 40. The stop 40 extends from the head 34 along the axial length of the neck 32 to a surface 42 of the portion 18, and its radial size is coextensive with the size of the head 34, as may be best observed in FIG. 3. This radial size of both the head 34 and the stop 40 is still somewhat less than the diameter of the cylindrical portion 18. The reason for this diminished size of the head 34 and the stop 40 is that it has to fit within a sleeve 44. The sleeve 44 is designed to be secured within the upper tube 14, somewhat offset from the end thereof so as to leave free the above-mentioned area, as at 30, note FIG. 3. Preferably, the sleeve also is secured within the upper tube 14 by a suitable adhesive compatible with the material of the tube 14 and of the sleeve 44. On its inside, the sleeve 44 is provided with a pair of keys 46 and 48. The keys 46 and 48 are both angularly offset as well as axially spaced apart with respect to each other, as may be best observed in FIG. 3. The keys 46 and 48 also are formed with radially converging sides 50 so as to be slidably fit into and through the keyway 36 formed in the member 16. With both the member 16 and the sleeve 44 secured within their respective tubes 12 and 14, the swivel stop 10 is assembled first, by positioning the free end 30 of the upper tube 14 over the head 34 of the member 16, and next, by angularly displacing the upper tube 14 with respect to the lower tube 12 until the first key 46 lines up with the keyway 36. Thereupon, the tubes 12 and 14 are axially displaced relative to each other until the second key 48 strikes the top surface of the head 34. When it does, the upper tube 14 again is angularly displaced somewhat with respect to the lower tube 12 until the second key 48 lines up with the keyway 36. Then, the tubes 12 and 14 again are axially displaced relative to each other until the key 48 also slides through the keyway 36. Further axial displacement of the tubes 12 and 14 is arrested by the tubes 12 and 14 abutting against each other. At this point, the swivel stop 10 is fully assembled as shown in FIG. 1. The upper tube 14 now can be rotated clockwise (see FIG. 2), somewhat less than 360° until the key 46 strikes the stop 40. The swivel stop 10 of the invention thus keeps the lamp unit, of which it forms a part, together, it allows it to be swiveled about one revolution, and yet it effectively prevents the tubes 12 and 14 from being disengaged accidentally. Still, the swivel stop 10 permits the disassembly of the unit by reversing the above-described motions of assembly.

And the swivel stop 10 of the invention accomplishes this secure and relatively simple assembly and disassembly by the provision of only two parts, the member 16 and the sleeve 44, in the respective ends of the tubes 12 and 14.

An alternate embodiment of a swivel stop 52 arrangement is shown in FIGS. 4 and 5. The swivel stop 52 incorporates the same principles as the non-extendable version of the swivel stop 10 above described. Additionally, however, the swivel stop 52 allows for an adjustable extension through the swivel stop 52 itself. The swivel stop 52 also comprises a lower tube 54 and an upper tube 56, but they are no longer of the same diameter. Rather, one tube, here tube 54, is designed telescopically to fit within the other tube, to wit, tube 56. A member 58, like member 16, is formed with a lower cylindrical portion 60 and an upper portion 62. The lower portion 60 is in all respects identical with the lower portion 18 of the member 16. The upper portion 62 is identical with the upper portion 20 of the member 16 except for the length of a neck 64. While the axial length of the neck 32 is determined by the axially spaced apart keys 46 and 48, the axial length of the neck 64 can vary within practical limits of construction. Preferably, the length of the neck 64 is about eight to ten inches. The swivel stop 52 in FIG. 4 is shown at its full length extension. The neck 64 further carries a head 66 provided with a keyway 68, and a sleeve 70 is secured within the upper tube 56. The sleeve 70, however, is secured further up within the tube 56 as determined by the selected length of the neck 64, observe FIG. 4. The sleeve 70 also is provided with a pair of keys 72 and 74 that are angularly offset and axially spaced apart, and are designed to slide through the keyway 68. The face of the head 66 preferably is formed with a slight radius, observe FIG. 5, and is designed frictionally to engage, together with a stop 76, the inside of the sleeve 70. Also preferably, the head 66 and the stop 76 are formed a bit larger than the head 34 of member 16 so as to exert somewhat larger frictional contact with the sleeve 70. This is desirable since it is this frictional contact between the head 66 and the sleeve 70 that arrests not only the rotational movement of one tube 56 with respect to the other 54 but also the lengthwise adjustment of the swivel stop 52 itself. It is understood that the operator has to overcome this frictional force in order to set a different length for the swivel stop 52. It is, of course, readily apparent that this alternate swivel stop 52 is assembled and disassembled in exactly the same fashion as described in detail above with respect to the non-extendable swivel stop 10.

Thus it has been shown and described a swivel stop 10 designed for use in lamps of all kinds, which swivel stop 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A swivel stop comprising:

(a) a lower tube and an upper tube;

(b) a member partially secured within said lower tube and partially extending therefrom and formed with a keyway and a stop;

(c) a sleeve secured within said upper tube and provided with a pair of angularly offset and axially spaced apart keys;

(d) said partially extending portion of said member, designed to fit into and within said sleeve;

(e) said keys projecting radially inwardly from said sleeve;

(f) said keys designed to be axially displaceable within said keyway; and (g) said tubes being rotatable relative to one another until one of said keys strikes said stop.

2. The swivel stop of claim 1 wherein said lower and upper tubes have substantially identical inner and outer diameters.

3. The swivel stop of claim 1 wherein said lower tube is designed to fit telescopically within said upper tube.

4. The swivel stop of claim 1 wherein said member is formed with an axial hole.

5. The swivel stop of claim 4 wherein said partially secured portion of said member is cylindrical in configuration and provided with a plurality of external, radial and axial grooves designed to facilitate said member being secured within said lower tube.

6. The swivel stop of claim 4 wherein said partially extended portion of said member comprises a head and a neck, with said keyway formed in said head and said stop formed on said neck.

7. The swivel stop of claim 6 wherein said stop extends along the axial length of said neck and is radially flush with said head.

8. The swivel stop of claim 7 wherein the external surface of said head is designed frictionally to engage the inner surface of said sleeve.

9. The swivel stop of claim 8 wherein the external surface of said stop also is designed frictionally to engage the inner surface of said sleeve.

10. The swivel stop of claim 6 wherein the axial length of said neck is determined by said axially spaced apart keys.

11. The swivel stop of claim 6 wherein the axial length of said neck is more than twice the distance of said axially spaced apart keys.

12. The swivel stop of claim 1 wherein said stop is designed to limit the angular displacement of said upper tube relative to said lower tube to less than 360°.

* * * * *